United States Patent

[11] 3,620,872

| [72] | Inventor | Terence Frank Backwell<br>Whitchurch, Bristol, England |
|---|---|---|
| [21] | Appl. No. | 758,905 |
| [22] | Filed | Sept. 10, 1968 |
| [45] | Patented | Nov. 16, 1971 |
| [73] | Assignee | The Robinson Waxed Paper Company Limited<br>Bristol, England |
| [32] | Priorities | Sept. 15, 1967 |
| [33] | | Great Britain |
| [31] | | 42,128/67;<br>Feb. 2, 1968, Great Britain, No. 5,385/68 |

[54] METHOD OF MAKING LAMINATED WEB LAMINATED MATERIAL USING A REUSABLE CARRIER
10 Claims, 3 Drawing Figs.

[52] U.S. Cl............................................... 156/231,
156/233, 156/238, 156/244, 156/246, 156/247, 156/289

[51] Int. Cl............................................................ B29b 3/00
[50] Field of Search............................................. 156/246,
233, 247, 333, 289, 231, 238, 244

[56] References Cited
UNITED STATES PATENTS

| 2,780,574 | 2/1957 | Ott et al......................... | 156/246 X |
| 3,078,179 | 2/1963 | Kohn et al..................... | 156/246 X |
| 3,265,548 | 8/1966 | Harkins et al.................. | 156/246 X |
| 3,442,742 | 5/1969 | Jorgensen...................... | 156/246 X |

*Primary Examiner*—Benjamin R. Padgett
*Assistant Examiner*—Stephen J. Lechert, Jr.
*Attorney*—Jones and Lockwood ABSTRACT: A method of processing web material supported on a carrier and subsequently separating the processed web and carrier.

METHOD OF MAKING LAMINATED WEB LAMINATED MATERIAL USING A REUSABLE CARRIER

This invention relates to the processing of web material and products made therefrom.

The conversion of web materials involving, for instance, the application of coatings, lacquers and printing material, is often hampered by difficulties such as extensibility and heat distortion in the materials and thus accurate processing is made difficult. It is an object of this invention to provide a method of processing which obviates the difficulties referred to above.

According to this invention I provide a method for the preparation of a multilayer web material comprising:

providing a reusable carrier stable to the conditions to be employed applying to the said carrier a coating of polymeric material, the coating in itself being nonself-supporting but being capable of subsequent separation from said carrier when the coating has become part of a self-supporting assembly processing comprising adhesion promotion, said coating applying to said processed coating at least one further layer of material whereby a self-supporting assembly, including said coating and any additional processing matter, is formed, and subsequently separating said assembly from said carrier.

The carrier may be in the form of a web of material stable to the conditions to be employed. The web may conveniently be of a polished film such as polyester film. An example of such film is 100- or 200-gauge polyester film known in the United Kingdom as Melinex (I.C.I. Ltd. Trademark). Alternatively the carrier web may be of a paper-foil laminate synthetic rubber, stainless steel or other metals, or a pretreated web such as Melinex coated with vacuum-deposited aluminum or Melinex to which a release coating has been applied. The material of the carrier will vary dependent on the coating with which it is to come in contact. The carrier can be endless or can be a reel-to-reel web.

Alternatively the carrier may be in the form of a drum and if desired provided on its external surface with a release covering such as that provided by fluoroethylene polymers and copolymers.

The surface of the carrier may be embossed or etched to give any desired finish to the processed web material.

The coating of polymeric material may be applied to the carrier by such methods as melt extrusion, aqueous dispersion coating, solvent-based lacquering and hot melt coating. The coating may be of substances such as vinylidene chloride copolymers, polyolefines, wax/copolymer blends and cellulosic derivatives.

The subsequent processing of the coating on the carrier may include the application of print, the deposition of metal and the application of lacquers and adhesives dispersions and extrudates and any other such treatment necessary to complete the construction of the self-supporting finished assembly.

The layer or layers of material to form the finished self-supporting assembly may be of such polymers as polyethylene or polypropylene, ethylene-vinyl acetate copolymer or vinylidene chloride copolymers. Alternatively it may be of regenerated cellulose film, paper, board, metal foil or other material to which it is desired to apply a coated finish.

The invention will now be further described and exemplified with reference to the drawings filed herewith wherein.

EXAMPLE 1

Figure 1:
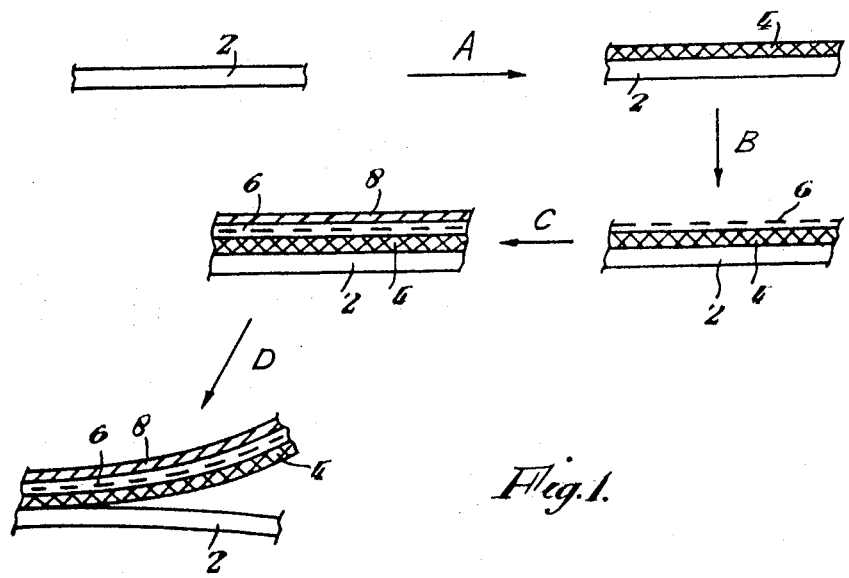
FIG. 1 is a diagrammatic representation of the preparation of a vinylidene chloride copolymer/print/polythene laminate material as described in Example 1.

As shown in FIG. 1 a vinylidene chloride copolymer/print/polythene laminate material was made by the use of a carrier web 2 of polyester film such as 100-gauge Melinex. This web 2 was dispersion coated with a layer 4 to 12 grams per square meter of vinylidene chloride copolymer (step A), followed by the application of print 6 (step B). A suitable primer was applied on the printed surface before an extrusion coating of 47 grams per square meter polyethylene film 8 (step C). The polyester carrier web 2 was separated from the prepared material (step D) and could be reused, the delamination strength being about 80 to 100 grams per inch width. The surface of the vinylidene chloride copolymer 4 was found to be excellent and glossy and free from the mottle which is often found on vinylidene chloride copolymer coated films. Only a very small distortion was found between repeat print distances—less than in the case of conventional methods of preparing vinylidene chloride copolymer coated polyethylene. The barrier properties were also satisfactory.

It will be seen that in the process according to the invention the coating 4 which is first applied to the carrier 2 has been transferred to the layer 8.

EXAMPLE 2

Figure 2:
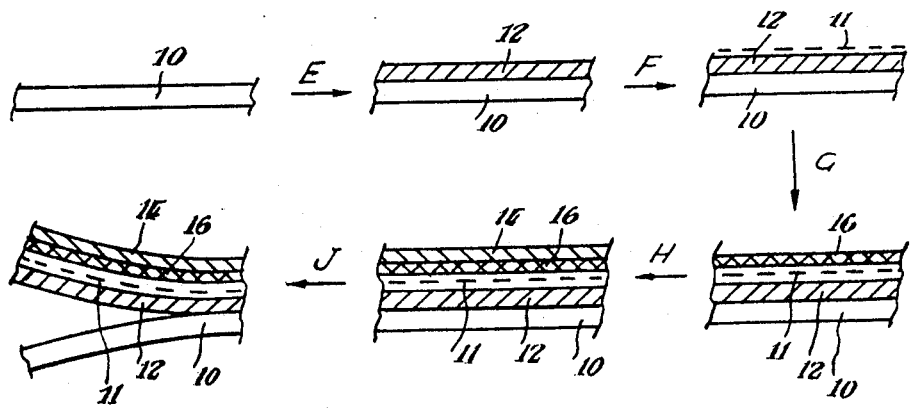
FIG. 2 is a diagrammatic representation of the preparation of a polypropylene/print/lacquer/ethylene-vinyl acetate copolymer material as described in Example 2.

As shown in FIG. 2 a laminate material comprising ethylene-vinyl acetate copolymer film lacquer-laminated to a printed polypropylene coating 12 onto a carrier web 10 of paper-foil laminate (step E). The polypropylene surface was then printed with a layer of print 11 to close register by gravure printing (step F) and a film 14 of ethylene-vinyl acetate copolymer laminated to the printed polypropylene by use of a two-component heat-curing adhesive 16 (steps G & H). Finally, the paper-foil carrier web 10 was separated from the polypropylene/print/lacquer-laminate/ethylene-vinyl acetate copolymer material and the carrier web 10 could be reused (step J).

EXAMPLE 3

Instead of coating the carrier web with polypropylene as in example 2 the paper-foil carrier web was dispersion coated with vinylidene chloride copolymer to an extent of 12 grams per square meter and the coating then printed, primed and 47 grams per square meter of ethylene-vinyl acetate copolymer extruded thereon. The vinylidene chloride copolymer/print/primer/ethylene-vinyl acetate copolymer material was then separated from the paper-foil carrier web to which it had a delamination strength of less than 30 g./in. width.

Alternatively, vinylidene chloride copolymer/print/polyethylene film laminate may be prepared by using a carrier web of paper-foil or a vinylidene chloride copolymer/print/ethylene-vinyl acetate copolymer laminate prepared using 100-gauge Melinex as the carrier web.

In each of the examples set out above, the delamination step may be carried out by delaminating the plies in a rubber/steel nip, using a warm nip at 40° to 50° C. if desired to assist smooth delamination.

EXAMPLE 4

A 200-gauge Melinex polyester film was coated with 6 g./sq. meter of vinylidene chloride-alkyl acrylate copolymer using conventional aqueous dispersion techniques and the coating dried by hot air infrared heating. The copolymer coating on the Melinex carrier was gravure printed and coated with 2 to 3 g./sq. meter of a laminating adhesive and the adhesive surface laminated to (a) polyethylene film and the copolymer coated polyethylene delaminated from the Melinex carrier.

The experiment was twice repeated replacing the polyethylene film (a) by (b) ethylene-vinyl acetate copolymer film and (c) 35 g./sq. meter Glazed Imitation Parchment paper.

In the case of (a) and (b) the finished materials possessed excellent gloss and barrier properties and were free from the stretch and distortion associated with conventional methods of processing similar extensible thermoplastic films.

In the case of (c) the coating attached to the permanent paper substrate was glossy and pinhole-free, and in barrier properties was comparable with a weight of vinylidene chloride copolymer several times heavier when applied direct to the paper by conventional methods.

EXAMPLE 5

Approximately 2 g./sq. meter dry weight of a solution of nitrocellulose/plasticiser in isopropyl acetate was applied to a carrier web of Melinex film. The adhesion of this coating was measured as 10–20 g./sq. meter stripping strength per inch width.

The nitrocellulose lacquered Melinex carrier was laminated in each case with 2–3 g./sq. meter of adhesive to (a) Glazed Imitation Parchment paper, (b) a clay coated paper and (c) a foil/paper lamination, all of which materials have previously been gravure printed.

On delamination in each case at the interface of the Melinex carrier and the nitrocellulose lacquer, the permanent substrate carried a coating of the nitrocellulose lacquer over the print to produce a glossy surface and protective coating. This was rated visually as at least as good as a two-component heat-curing gloss lacquer applied direct to the paper, without having had to employ the comparatively high-curing temperature required for a heat-curing lacquer.

Figure 3:
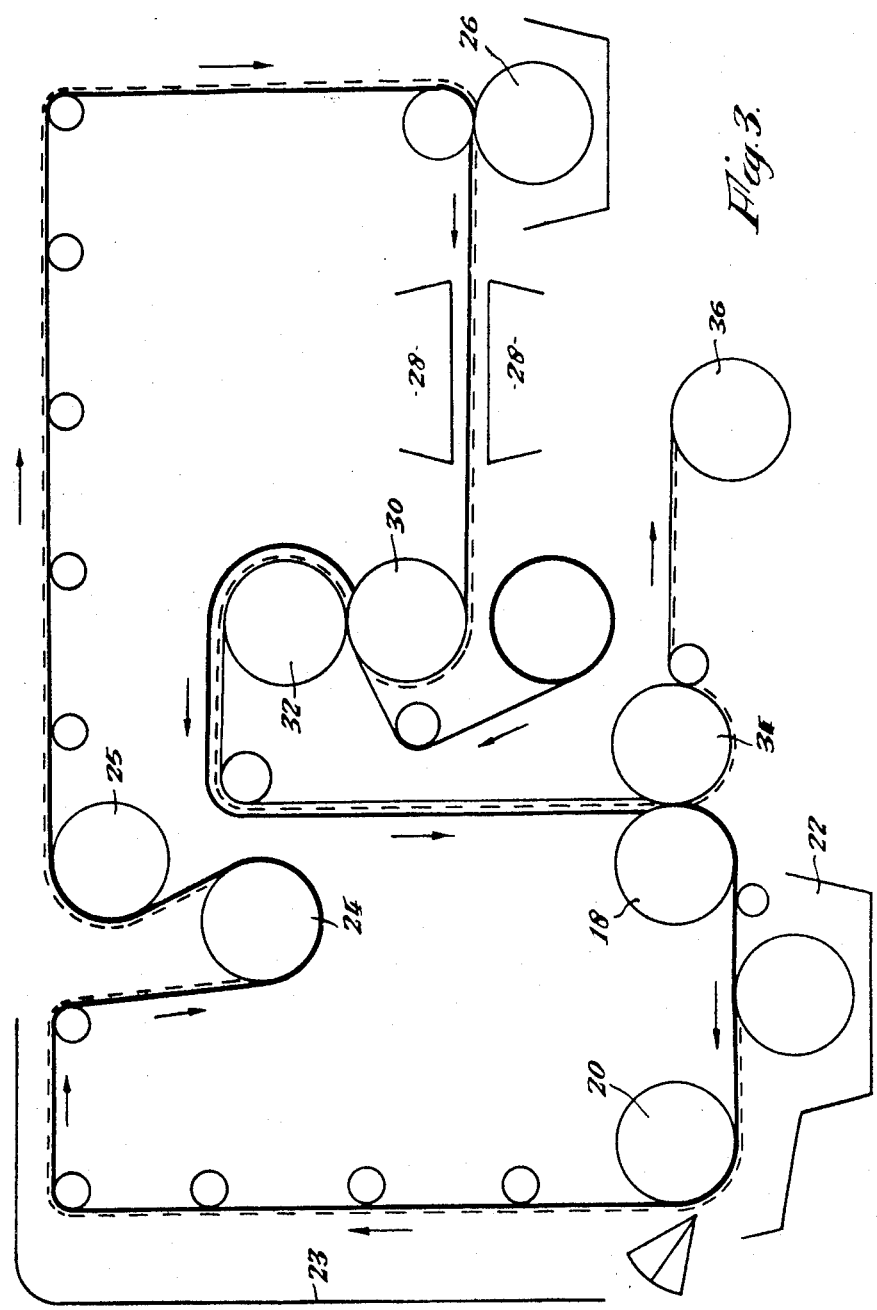
FIG. 3 is a schematic diagram illustrating a continuous method of processing.

One method according to the invention is illustrated diagrammatically in FIG. 3. This shows the preparation of a vinylidene chloride copolymer-coated polyethylene film with the layers lacquer-laminated together. An endless belt of polyester (shown in thick black lines) is carried round rollers 18 and 20 and has applied to it by air-knife-coating methods from the unit 22 a coating of vinylidene chloride copolymer in the form of a dispersion (shown by dotted lines.) The excess liquid is dried in the region of the drying hood 23 and the coating heated to coalesce the layer. The coating thus formed is very thin and cannot at this stage be removed from the carrier web to give a self-supporting film although the coating and carrier are subsequently separable. The coated carrier web is then led round cooling cylinders 24 and 25 to a lacquer application station 26 and a drying station 28 and then between two nip rollers 30 and 32 where there is introduced a web of polyethylene film (shown as a thin line). Thus at this stage there has been prepared a carrier web on which lies the vinylidene chloride copolymer coating with the polyethylene film laminated to it. The coated polyethylene film is separated from the carrier web at the roller 34 and the desired material wound about the roll 36. The carrier web is recirculated around the system.

Many other web materials may be processed and composite assemblies produced using a method according to the invention. For example, a printed paper coated on opposite sides with vinylidene chloride copolymer may be prepared by the coating of about 8 g./sq. meter vinylidene chloride copolymer onto a temporary carrier and lacquer laminating a preprinted surface of a clay coated paper thereto followed by removal of the temporary carrier to leave a vinylidene chloride copolymer coated and printed paper. The uncoated side of the paper may then be similarly lacquer laminated to a second vinylidene chloride copolymer coating borne on a temporary carrier. Such a coated paper will have good gloss and pinhole free characteristics. Wrappers using such coated papers will have barrier properties superior to those employing a heavier weight coating of vinylidene chloride copolymer applied to the paper by conventional techniques.

What I claim and desire to secure by Letters Patent is:

1. Method for the preparation of a multilayer web material comprising:
   coating a reusable carrier with a nonself-supporting layer of polymeric material;
   applying an intermediate layer of material to said nonself-supporting layer, said intermediate layer being selected from the group consisting of primers and adhesives;
   adhering over said intermediate layer at least one layer of web-forming material to form a self-supporting assembly comprised of said web-forming material, said intermediate layer and said nonself-supporting layer; and
   subsequently separating said self-supporting assembly from said carrier.

2. The method of claim 1 wherein the said nonself-supporting coating is of vinylidene chloride copolymer.

3. The method of claim 1 wherein the said nonself-supporting coating is selected from the group consisting of ethylene vinyl acetate copolymer, a polyolefin and a solvent based lacquer.

4. The method of claim 1 wherein the carrier is in the form of a web of a material selected from the group consisting of polyester film and paper/foil laminate.

5. The method of claim 1 wherein the carrier is an endless belt made of a material selected from the group consisting of polyester film and stainless steel.

6. The method of claim 1 wherein said layer of web-forming material is selected from the group consisting of polyolefins, ethylene/vinyl acetate copolymer, vinylidene chloride copolymer, paper, board and regenerated cellulose film.

7. The method of claim 1 wherein said carrier has an embossed or etched surface.

8. The method of claim 1 wherein said carrier is precoated with a substance to facilitate subsequent separation of said carrier and said self-supporting assembly.

9. The method of claim 1, further comprising the step of applying a layer of print prior to adhering said layer of web-forming material over said intermediate layer.

10. The method of claim 9 wherein the said nonself-supporting coating is of vinylidene chloride copolymer.

* * * * *